United States Patent [19]
Shvarts et al.

[11] Patent Number: 5,421,962
[45] Date of Patent: Jun. 6, 1995

[54] DESALINATION PLANT FOR SALT WATER USING SOLAR ENERGY

[76] Inventors: Mikhail E. Shvarts, ul.Baikalskaya, d.44, korp.I, kv.6I, 107497 Moscow, Russian Federation; Alexei M. Shvarts, Neve Yaakov 2/7, Jerusalem, Israel

[21] Appl. No.: 19,247

[22] Filed: Feb. 18, 1993

[51] Int. Cl.$^6$ ............................................. C02F 1/14
[52] U.S. Cl. ................................. 202/234; 202/235; 202/267.1; 159/903; 159/904; 203/10; 203/86; 203/89; 203/90; 203/DIG. 1; 203/DIG. 17
[58] Field of Search ............... 202/234, 267.1, 236; 203/DIG. 1, 10, 86, 90, 89, DIG. 17; 159/904, 903

[56] References Cited

U.S. PATENT DOCUMENTS

| | | | |
|---|---|---|---|
| 3,138,546 | 6/1964 | Muller | 203/DIG. 1 |
| 3,390,056 | 6/1968 | Ingram | 159/904 |
| 3,501,381 | 3/1970 | Delano | 159/904 |
| 3,642,583 | 2/1972 | Greenberg et al. | 203/100 |
| 3,801,474 | 4/1974 | Castellucci et al. | 203/DIG. 1 |
| 4,959,127 | 9/1990 | Michna | 159/904 |
| 5,112,446 | 5/1992 | Vallon | 203/DIG. 1 |

FOREIGN PATENT DOCUMENTS

| | | | |
|---|---|---|---|
| 3242581 | 5/1984 | Germany. | |
| 2140691 | 6/1987 | Japan | 203/DIG. 1 |
| 861882 | 9/1981 | U.S.S.R. | 203/DIG. 1 |
| 1139937 | 2/1985 | U.S.S.R. | 203/DIG. 1 |

*Primary Examiner*—Wilbur Bascomb, Jr.
*Attorney, Agent, or Firm*—Collard & Roe

[57] ABSTRACT

The present invention relates to water treatment using solar energy.

The desalination plant includes an evaporator-desalter communicating with an intake system for water to be desalinated and a vapour and condensate discharge system. The evaporator is essentially at least a portion of a water pool wherein the density of water is higher than that of the water being desalinated, and mounted above the water pool are atomizers and branch pipes of the vapour and condensate discharge system. The atomizers and the branch pipes are provided with a collapsible roof. The surface of the water pool of the evaporator is covered with a film having floating elements shaped as balls.

The invention can be used for water desalination in droughty and waterless coastal areas nearby the seas and oceans.

1 Claim, 2 Drawing Sheets

DESALINATION PLANT FOR SALT WATER USING SOLAR ENERGY

FIELD OF THE INVENTION

The present invention relates to water treatment, particularly to a plant for desalting salty, for example, sea water using the solar energy.

The invention can be advantageously used in droughty and waterless coastal areas nearby the seas and oceans.

BACKGROUND OF THE INVENTION

Known in the art are several methods of desalting sea water, however, the most efficient one is the method using the solar energy.

Known in the art is a plant for desalination of salty water, for instance, sea water, (DE, A 3242581) using the solar energy comprising an evaporator-desalter and water intake means and vapour and condensate discharge means communicating therewith. The evaporator-desalter is essentially a cylindrical housing provided with a heat-absorbing roof and accommodating evaporator segments radially positioned therein. Arranged above the segments are atomizers, and in the centre of the housing fans are provided. Sea water admitted through the atomizers ensures constant moistening of the evaporator segments. The fans, while rotating, ensure circulation of air in the evaporator segments. The means for discharging vapour and condensate discharges the water vapour and condenses it.

The basic disadvantage of the known plant is the evaporator limited area which is attributed to the high cost required for its construction, and its low efficiency. Its servicing is also expensive since it is necessary to repeatedly remove salt layer therefrom.

OBJECTS AND SUMMARY OF THE INVENTION

It is an object of the invention to reduce the cost of the desalination plant for salty, for example, sea water.

It is another object of the present invention to enhance the efficiency of the desalination.

Said and other objects of the invention are attained by that in a desalination plant for salty, for example, sea water using the solar energy, comprising an evaporator-desalter incorporating a heat-absorbing roof and atomizers and an intake means for water to be desalinated from a water pool and a vapour and condensate discharge means, communicating with the evaporator-desalter. According to the invention, the evaporator-desalter is essentially at least a portion of a water pool wherein the density of water is higher than that of the water being desalinated, whereas the atomizers, the roof and the vapour and condensate discharge means are arranged above the surface of the water pool.

The proposed structure of the evaporator-desalter renders it possible to considerably curtail the expense necessary for its construction as well as to reduce the cost of the plant as a whole. Moreover, this structure helps increase the plant throughput, and, consequently, its efficiency.

The use of the plant makes the servicing cheaper by eliminating the necessity of removing the salt from the evaporator surface.

According to one of the embodiments of the invention, the evaporator-desalter is provided with a film from a polymer material, arranged on the surface of the water pool. The provision of the film prevents the water being desalinated from being diffused when the water from the atomizers gets onto the film surface, which is conducive to its more effective evaporation.

According to another embodiment of the invention, the evaporator-desalter is provided with a closed limiting float arranged along the periphery of at least a portion of the evaporator water pool and fastened to the film.

The provision of such a limiting float ensures reliable fixation of the film on the water pool surface.

Advantageously, the film is provided with perforations. This is necessary to let the brine, accumulated on the film surface, flow to the water pool whereby no considerable ground areas for the brine accumulation are required; moreover, no ecological disturbance is involved.

In a preferred embodiment of the invention the atomizers, the vapour and condensate discharge means and the roof are made as sections, each of which comprises a plurality of atomizers, a vapour and condensate discharge branch pipe, and a portion of the roof which is made collapsible.

This structure of the evaporation-desalter makes it possible to enhance the plant efficiency without considerable expense required.

BRIEF DESCRIPTION OF THE DRAWINGS

Other objects and advantages of the invention will be readily appreciated as the same becomes better understood by reference to the following detailed description when considered in connection with the accompanying drawings, wherein.

DETAILED DESCRIPTION OF PREFERRED EMBODIMENT

Figure 1:
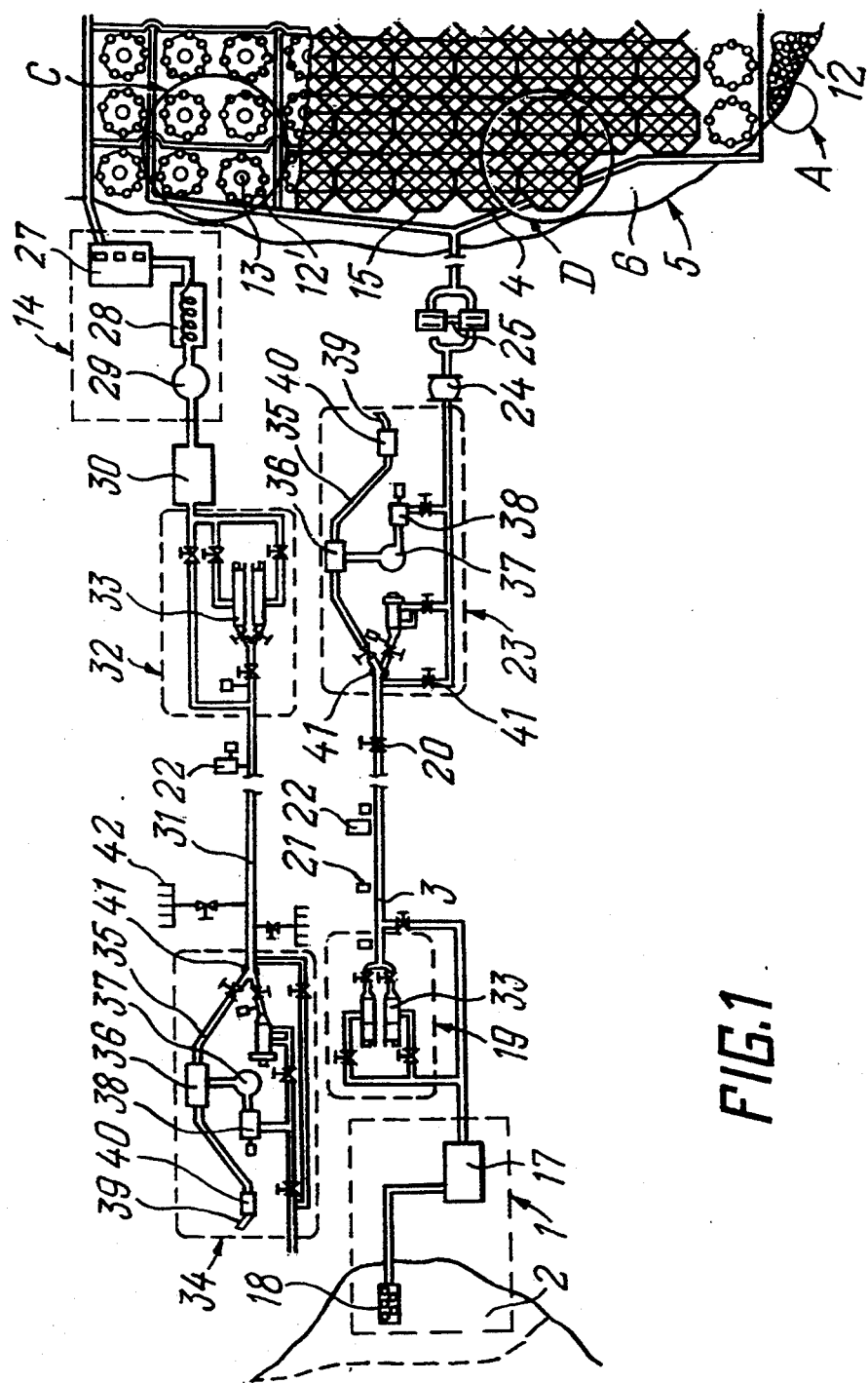
FIG. 1 shows a schematic diagram of the plant, according to the invention.
Figure 2:
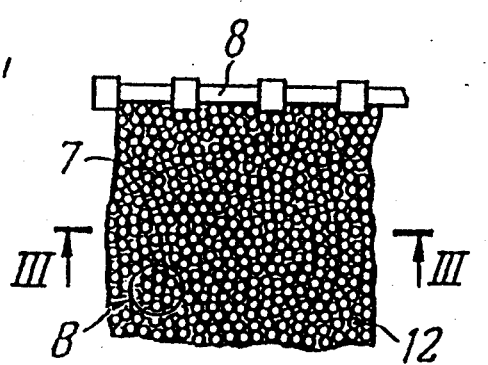
FIG. 2 illustrates a unit A of FIG. 1.
Figure 3:
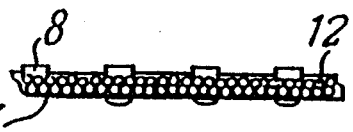
FIG. 3 is a section III—III of FIG. 2.

A desalination plant comprises a water intake means 1 (FIG. 1) from a water pool 2 containing water to be desalinated, the means communicating by means of a trunk pipeline 3, through a manifold 4, with an evaporator-desalter 5. The evaporator 5 is essentially at least a portion of an artificial or a natural water pool 6 having the water density higher than that of water to be desalinated from the water pool 2. The water surface in the evaporator 5 is covered with a film 7 (FIGS. 2, 3) made of a polymer material and provided along the periphery thereof with a closed limiting float 8.

Figure 4:
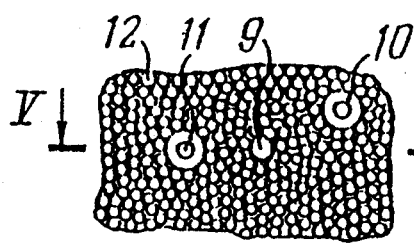
FIG. 4 is a unit B of FIG. 2.
Figure 5:
FIG. 5 is a section V—V of FIG. 4.

The film 7 is provided with perforations 9 (FIGS. 4, 5) for draining accumulated brine into the water pool 6, and floats 10, also provided with perforations 11. The provision of the floats 10 prevents formation of "bags" on the surface of the film 7. The film 7 has a plurality of floating elements 12, for example, shaped as balls made from microporous water-repellent material.

Figure 6:
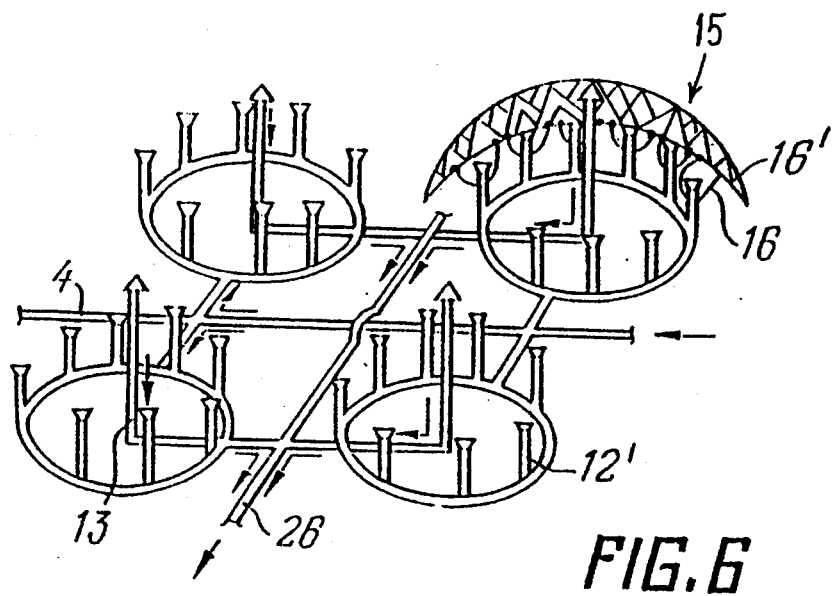
FIG. 6 is a unit C of FIG. 1.
Figure 7:
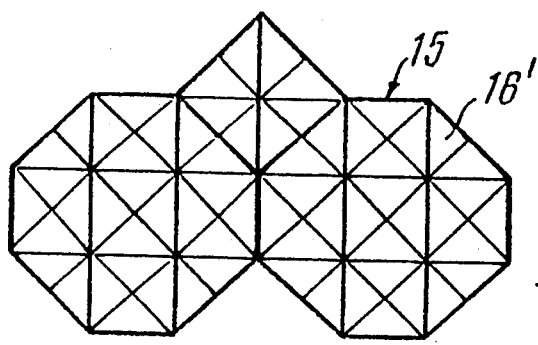
FIG. 7 is a unit D of FIG. 1.

Installed above the film 7 are atomizers $12^1$ (FIG. 6) connected to the manifold 4, branch pipes 13 of a vapour and condensate discharge means 14, and a sectional roof 15, all said elements $12^1$, 13, 15 being integrated into section $15^1$. Each section $15^1$ comprises several atomizers arranged, for instance, around a circumference mounted in the center thereof is the branch pipe 13 having a larger height. The atomizers 12¹ and the branch 13 of each section 15¹ are provided with supports 16 resting whereon is a portion 16¹ of the roof 15 which may be made dome-shaped. The roof 15 (FIGS. 6, 7) is manufactured from a special material transparent for sun rays and opaque for infrared rays. Some portions 16¹ of the roof 15 can be provided with electric heating operated from supply lines, solar storage batteries (not shown), or wind-driven electric generators (not shown) mounted above the roof 15 or on the trunk pipeline 3. The water intake means 1 comprises a pumping station 17 mounted on the trunk pipeline 3 and connected to filters 18 located in the water intake of the water pool 2. A unit (not shown) may be provided between the filters 18 and the pumping station 17, adapted for "lightening" of water, that is, for extracting mineral salts therefrom with the exception of sodium chloride. Mounted on the pipeline 3 downstream of the pumping station 17 (as along the water flow direction) is a unit 19 for admitting decontamination agents for the pipeline 3, instruments and weighted containers (not shown). The linear portion of the pipeline 3 incorporates quick-acting gate valves 20, indicators 21 for monitoring the travel of the containers and dampers 22 of hydraulic impacts.

Installed in the end of the linear portion of the pipeline 3 is a unit 23 for receiving the decontamination agents, instruments and containers arranged downstream of the unit 23 is an accumulation tank 24, and further, hydro-generators of a hydroelectric power station 25. The vapour and condensate discharge means 14 incorporates a manifold 26 communicating with the branch pipes 13. Mounted at the outlet of the manifold 26 are a vapour pumping out station 27 and a cooler 28 with a condensate collector 29 communicating through a pumping station 30 with a water distributing main 31.

For cleaning periodically the distributing main 31 and to effect control of its condition, installed on the main 31 downstream of the pumping station 30 is a unit 32 for admitting the decontamination agents, instruments and weighted containers. Each unit 19, 32 incorporates a standard two-chamber mechanism 33 through which various agents are introduced into the trunk pipeline 3 and the distributing main 31, as well as auxiliary fittings, automatic and telemechanic control systems using computers. The end of the main 31 carries a unit 34 for receiving the decontamination agents, instruments and weighted containers. Each unit 23 and 34 is provided with a device for receiving the containers made as an arcuate pipe 35 with perforations in the upper portion thereof which is placed in a shell 36. The upper portion of the pipe 35 is connected to an intermediate reservoir 37 connected to a pump 38 whose outlet communicates with the user. The lower portion 39 of the pipe 35 also has perforations and is enclosed in shell 40.

To distribute pigs, instruments and containers, the inlet of the pipe 35 is provided with a pointer 41.

The plant operates as follows. Sea water is sucked in from the water intake of the water pool 2 through the filters 18 into the unit adapted for extracting mineral salts therefrom. From this unit the "lightened" water is fed to the pumping station 17, wherefrom water is pumped into the pipeline 3, and further, through the accumulation tank 24 and the hydroelectric power station 25, is passed into the manifold 4, and through the atomizers 12¹, to the evaporation zone located above the water pool 6. Under the effect of the solar energy vapour formation takes place under the roof 15. Water which has yet been evaporated and remains on the surface of the balls 12 also contributes to the vapour formation, whereby a vapour zone is formed between the film 7 and the roof 15.

Vapour formed under the roof 15 is pumped out along the manifold 26 by a vapour pumping out station 27 to the cooler 28, and further, to the condensate collector 29 (water catcher). From the condensate collector 29 the desalinated water after an appropriate treatment and sanitary control is pumped through the pumping station 30 either to a local supply line, or to a distributing main 31 which can be provided with a plurality of desalinated water outlet pipes 42 enabling vast territories adjoining the water main layout to be supplied with fresh water. When the containers get into the units 23, 34, water is fed to the intermediate reservoir 37, and is pumped out therefrom by the pump 38 to the user or to a water storage basin. The containers separated in such a manner from the water push one another along the inclined portion of the pipe 35 downwards. Having passed the perforated lower portion of the pipe 35, the containers leave the pipe 35 through its lower portion 39, to be placed into racks (not shown).

In arid regions, for the formation of cloudiness and rain-clouds, a portion of the roof 15 of the evaporator 5 can be removed. In this case evaporation of sea water into the atmosphere takes place from this portion of the evaporator.

Due to the enlarged atomization and evaporation area of sea water in the water pool 6, the efficiency of the plant becomes practically unlimited. Moreover, since the water density in the pool 6 is higher, the pipes carrying the atomizers 12¹ filled with water from the pool 2 do not sink. As the brine accumulates on the surface of the film 7, it sinks down (due to its higher density as compared to water) into the water pool 6 through the perforations 9,11.

All the pipes are manufactured from light and strong materials, resistant to corrosion and featuring enhanced heat transfer characteristics.

The trunk pipeline 3 is installed on supports at some distance from the ground so as to make use of the solar energy for preheating of the pumped water. If there is no sun, the preheating of the pumped water can be effected with the aid of a ribbon-type electric heater wound onto the pipes, the energy being supplied from solar storage batteries (not shown) or wind-driven electric generators (not shown).

The distributing main 31 is advantageously laid in the ground at a certain depth so that the desalinated water can retain a stable temperature.

The use of the trunk pipeline 3 and the distributing main 31 for transfer of differently weighted containers in the flow of the pumped water offers unlimited prospects for developing territories adjoining the water main layout route.

The plant of the present invention pays out within the time period not exceeding 3 years. The electric power consumption for desalting of 1 m³ of water is 12 kw/h.

When the pipeline having the diameter of 150 mm is used, the capacity of the plant is 100 m³/h.

The efficiency of the plant is not less than 75%.

We claim:

1. A desalination plant for salt water using solar energy comprising:

an intake means for salt water to be desalinated;

an evaporator-desalter means having a surface communicating with said intake means and comprising means containing at least a portion of a water pool wherein the density of the water in the water pool is higher than that of the salt water being desalinated;

atomizers for said evaporator-desalter means communicating with said intake means for salt water to be desalinated and mounted above said surface of said evaporator-desalter means;

a heat absorbing roof for said evaporator-desalter means arranged above said atomizers;

said evaporator-desalter means being provided with a polymer material film placed on the surface of the means containing the water pool;

said evaporator-desalter means being provided with a closed limiting float arranged along the periphery of at least a portion of the water pool of the evaporator-desalter means and attached to the film; and wherein the film has perforations and distillate condensing means and distillate recovery means for the water which has been desalinated.

* * * * *